(12) United States Patent
Kim et al.

(10) Patent No.: US 8,596,534 B2
(45) Date of Patent: Dec. 3, 2013

(54) INTERFACE SYSTEM BETWEEN A TERMINAL AND A SMART CARD, METHOD FOR SAME, AND SMART CARD APPLIED TO SAME

(75) Inventors: Jin-Tae Kim, Seoul (KR); Kyung Ok Lee, Seoul (KR); Eun Su Jung, Gwacheon-si (KR); Hoo Jong Kim, Seongnam-si (KR)

(73) Assignee: SK Planet Co., Ltd., Seoul (KR)

( * ) Notice: Subject to any disclaimer, the term of this patent is extended or adjusted under 35 U.S.C. 154(b) by 421 days.

(21) Appl. No.: 12/990,117

(22) PCT Filed: Jul. 29, 2009

(86) PCT No.: PCT/KR2009/004231
§ 371 (c)(1),
(2), (4) Date: Oct. 28, 2010

(87) PCT Pub. No.: WO2010/016679
PCT Pub. Date: Feb. 11, 2010

(65) Prior Publication Data
US 2011/0125967 A1    May 26, 2011

(30) Foreign Application Priority Data

Aug. 8, 2008 (KR) .......... 10-2008-0078153
Aug. 8, 2008 (KR) .......... 10-2008-0078156

(51) Int. Cl.
*G06F 12/00* (2006.01)
(52) U.S. Cl.
USPC ......... 235/451; 455/414.1; 455/418; 455/466
(58) Field of Classification Search
USPC .............. 235/451; 455/414.1, 418, 466
See application file for complete search history.

(56) References Cited

U.S. PATENT DOCUMENTS 7,353,044 B2 * 4/2008 Nachef .................. 455/558
2005/0282585 A1 12/2005 Heinonen et al.
(Continued)

FOREIGN PATENT DOCUMENTS

| CN | 1379608 | 11/2002 |
|---|---|---|
| CN | 101099400 | 1/2008 |

(Continued)

OTHER PUBLICATIONS

Korean Notice of Allowance for 10-2008-0078156 dated May 14, 2012.

(Continued)

*Primary Examiner* — Allyson Trail
(74) *Attorney, Agent, or Firm* — Lowe Hauptman & Ham, LLP

(57) ABSTRACT

The present invention provides a system and method for interfacing between a terminal and a smart card, and a smart card applied to the same. In other words, by presenting the configuration including a terminal equipped with several device resources requested for interworking during the execution of the service applications stored in a smart card, and a Universal Subscriber Identification Module (USIM), and a smart card to prepare the selective execution of the application considering the service supportable terminal based on a device resource list created by the terminal, it is possible to provide suitable services to the terminal performance considering the difference in the mounted terminal model and manufacturer due to the selective executability according to the device resources with which the terminal is equipped with a number of service applications stored in the smart card.

16 Claims, 6 Drawing Sheets

(56) References Cited

U.S. PATENT DOCUMENTS

| | | |
|---|---|---|
| 2007/0043957 A1 | 2/2007 | Benolt |
| 2007/0117551 A1* | 5/2007 | Boris et al. ............... 455/414.1 |
| 2009/0124251 A1 | 5/2009 | Niccolini |
| 2010/0136955 A1* | 6/2010 | Kuk et al. ............... 455/414.1 |
| 2010/0144336 A1* | 6/2010 | Kuk et al. ............... 455/418 |
| 2012/0190330 A1* | 7/2012 | Kuk et al. ............... 455/407 |

FOREIGN PATENT DOCUMENTS

| | | |
|---|---|---|
| EP | 1039403 | 9/2000 |
| JP | 2000-331096 | 11/2000 |
| JP | 2006-325228 | 11/2006 |
| JP | 2008-521107 | 6/2008 |
| KR | 1020050047704 | 5/2005 |
| KR | 1020060036768 | 5/2006 |
| KR | 1020080012835 | 2/2008 |

OTHER PUBLICATIONS

Korean Office Action for 10-2008-0078156 dated Mar. 9, 2012.
Carsten Rust et al.; "The SIM card as an Enabler for Security, Privacy, and Trust in Mobile Services"; ICT—Mobile Summit 2008; 8 Pages.
International Search Report for PCT/KR2009/004231.
The Office Action for Japanese Patent Application No. 2011-521999 mailed Sep. 4, 2012.
Chinese Search Report/Office Action for 2009801117895.

* cited by examiner

INTERFACE SYSTEM BETWEEN A TERMINAL AND A SMART CARD, METHOD FOR SAME, AND SMART CARD APPLIED TO SAME

CROSS REFERENCE TO RELATED APPLICATION

This application claims the priority of Korean Patent Application No. 10-2008-0078156 and Korean Patent Application No. 10-2008-0078153, respectively filed on Aug. 8, 2008, in the KIPO (Korean Intellectual Property Office), the disclosure of which is incorporated herein in their entirety by reference. Further, this application is the National Phase application of International Application No. PCT/KR2009/004231, filed Jul. 29, 2009, which designates the U.S. and was published in English. Each of these applications is hereby incorporated by reference in their entirety into the present application.

BACKGROUND

1. Field

One or more example embodiments relate to a method of interfacing between a terminal and a smart card, more specifically an interface system and method between a terminal and a smart card for preparing the execution of service applications stored in a terminal smart card through the initialization process between the terminal and the smart card during the implementation of an "Application On Card" functionality in the smart card stored terminal.

2. Description of the Related Art

A high capacity USIM card refers to a smart card with a configuration in the form of a single chip, for example combined with high-capacity NAND flash memory on the existing USIM card. This USIM card can be loaded with various operator services (WIPI Application, etc.), and provide customers with a large amount of memory (larger than 256 Mbytes or 1 GByte). Thus, the needs for high capacity USIM cards are increasing.

In this regard, previously mobile service applications resided on the software platform within a terminal, but as described above, with the development of high capacity smart card technology, the environment has been established to put service applications into USIM cards due to the increased card performance.

However, in order to implement an "Application on Card" functionality that executes service applications residing in a high capacity USIM card interworking with a terminal as described above, it is necessary to define a new interface standard between the terminal and USIM card.

SUMMARY

Example embodiments are to provide an interface system and method including a smart card applied to the same interface system and a method between a terminal and a smart card for preparing the execution of service applications stored in a terminal smart card through the initialization process between the terminal and the smart card during the implementation of an "Application on Card" functionality in the smart card stored terminal.

According to one or more embodiments, there may be provided an interface system between a terminal and a smart card for preparing the execution of service applications stored in the smart card, the interface system comprising: the terminal for including one or more device resources required for interworking during execution of a service application, creating and providing a list of the device resources; and the smart card for storing one or more service applications, selecting the service application capable of interworking with the terminal among the stored one or more service applications based on the list of the device resources provided from the terminal, and providing a list of the selected service application on the terminal.

According to one or more embodiments, there may be provided a smart card for preparing the execution of service applications stored in the smart card through interfacing with a mounted terminal, the smart card comprising: an application storage unit for storing one or more service applications executable based on the software platform; a list storage unit for storing a list of device resources received from the terminal; and a card control unit for selecting a service application capable of interworking with the terminal among the stored one or more service applications based on the list of the device resources stored in the list storage unit, and requesting for registration by providing the terminal with a list of the selected service application.

According to one or more embodiments, there may be provided an interface method for preparing the execution of a service application stored in a smart card, the interface method comprising: creating a list of an equipped device resources and sending the list of the equipped device resources to the smart card; receiving a list of a service application capable of interworking with the terminal among the stored service applications selected based on the list of the equipped device resources from the smart card; and registering a list of the selected service application provided from the smart card.

According to one or more embodiments, there may be provided an interface method with terminal for preparing the execution of stored service applications, the interface method comprising: receiving a list of device resources equipped on the terminal from the terminal and storing the list of the device resources; selecting a service application capable of interworking with the terminal among the stored service applications based on the list of the device resources; creating a list of the selected service application; and providing the terminal with the created list of the selected service application.

The system and method for interfacing between a terminal and a smart card, and smart card applied to the same according to the present invention makes it possible to provide services suitable for terminal performance for various service applications according to the selective executability depending on the availability of equipped device resources in terminals considering the differences in performance by the manufacturer and applied terminal model.

Moreover, the system and method for interfacing between a terminal and a smart card, and smart card applied to the same according to the present invention can change terminals into dummy devices allowing the mobile carriers to provide services directly to their customers without cooperation of the terminal manufacturers by implementing core functions of service applications within a smart card, and also, the development costs for terminal development can be reduced.

In addition, the system and method for interfacing between a terminal and a smart card, and smart card applied to the same according to the present invention will be able to maintain the mobile carrier's service and the customer's personal data if they hold the same smart card even though their terminal changes.

DETAILED DESCRIPTION OF PREFERRED EMBODIMENTS

With reference to the attached drawings, preferable embodiments of the present invention are explained below.

Figure 1:
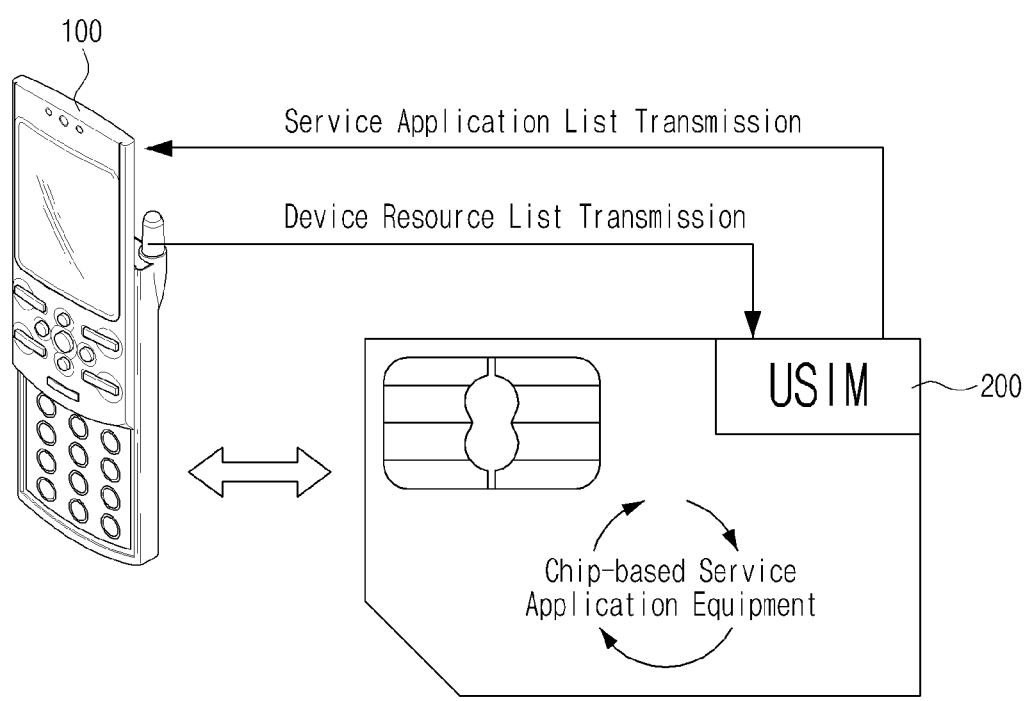
FIG. 1 is an outline configuration of an interface system between a terminal and a smart card according to an example embodiment of the present invention.

FIG. 1 depicts an outline configuration of an interface system between a terminal and a smart card according to an example embodiment of the present invention.

As shown in FIG. 1, it has a configuration including a terminal (100) equipped with several device resources required for interworking during the execution of service applications stored in the mounted smart card (200); and a smart card (200) stored with a Universal Subscriber Identification Module (USIM), for preparing the selective execution considering the service supporting terminals for several stored service applications based on the device resource list received from the terminal (100).

The above terminal (100) is equipped with several device resources required for interworking during the execution of service applications. In other words, the terminal (100) can have the configuration including a typical UI (User Interface) equipped with mobile communication terminals such as a keypad, LCD screen, speakers, etc. by the model or by the manufacturer, and also including wireless interface such as Bluetooth, WLAN, Cellular Modem, SDMB Receiver, TDMB Receiver, and wired interface such as UART, MMC, T-Flash, and multimedia devices such as a camera or mp3 decoder, and execute a particular device resource requested for interworking among the several commercial device resources according to the execution of a particular application in the mounted smart card (200).

To this end, the terminal (100) create a list of the several equipped device resources and provide the smart card (200) with the created device resource list during the initial startup with the power supply, that is, at the initial negotiation with the smart card (200).

Based on this, the terminal (100) receives the service application list capable of interworking based on the device resource list provided above by the smart card (200), and provides the terminal user with the available service application list based on the performance of the current terminal by registering the received service application list.

The above smart card (200) refers to a high capacity smart card that includes a Subscriber Identification Module basically, stored with a number of self-executable applications based on the software platform.

Based on this, the smart card (200) receives a device resource list provided by terminal (100) during the initial startup with the power supply, that is, at the step of initial negotiation with the terminal (200), and based on it, selects the executable service applications according to performance of the terminal (100). More specifically, the smart card (200) identifies the device resource required for each execution by the several service applications stored in the smart card (200), and determines if all the identified device resources exist on the device resource list provided by the terminal (100).

By doing so, the smart card (200) lists up only the corresponding service applications for which all the required device resources exist on the above device resource list and sends them to the terminal (100). For example, even though satellite DMB service applications are stored on the smart card (200), if a DMB receiving device does not exist on the terminal (100), this service application list cannot be registered on the terminal (100).

Meanwhile, the above terminal (100) receives a list of identification numbers of the stored service applications from the smart card (200) during the initial negotiation step with the smart card (200) when the power supply begins. Through this, the terminal (100) checks the identification number of a particular service application selected by the user, and it also can be configured to request the execution of a particular service application by delivering the confirmed identification number to the smart card (200).

Based on this, the terminal (100) receives the request to confirm support for the particular device resources required for executing the particular service application above, and by notifying the result to the smart card (200) if it is available, the output value by the execution of the service application is delivered. On the other hand, if the terminal (100) cannot support the above specific input/output device, it may be desirable to notify the user that the above particular service application cannot be executed on the I/O device, for example, LCD screen.

In this connection, the smart card (200) creates a list of identification numbers to distinguish each of the several service applications stored in the step of initial negotiation with the terminal (100) when the power supply begins and offers it for the terminal (100). By doing so, the smart card (200) calls to the service application based on the identification number if the request for the execution of a particular service application is received from the terminal (100) by transferring the identification number. In addition, the smart card (200) collects the device resource list required for executing when a specific service application is invoked, and requests the terminal (100) to check if it supports the device resources and only after confirming the support, the requested service application is executed and the output value is delivered to the terminal (100).

As examined above, according to the interface system between a terminal and a smart card of the present invention, the terminal (100) has only the form of a dummy device, and mobile carriers can provide the services directly to the customers through the smart card (200) without cooperation of the terminal manufacturers by implementing the core functions of the service application within the smart card. In addition, for various service applications stored in the smart card (200), it is possible to provide the services suitable for terminal performance according to the selective executability depending on the availability of equipped device resources in terminals considering the differences in performance by the manufacturer and applied terminal model.

Figure 2:
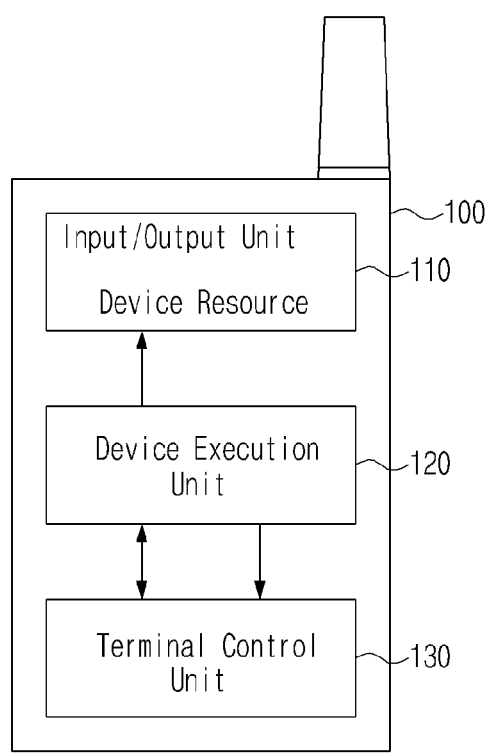
FIG. 2 is an outline configuration of a terminal according to an example embodiment of the present invention.
Figure 3:
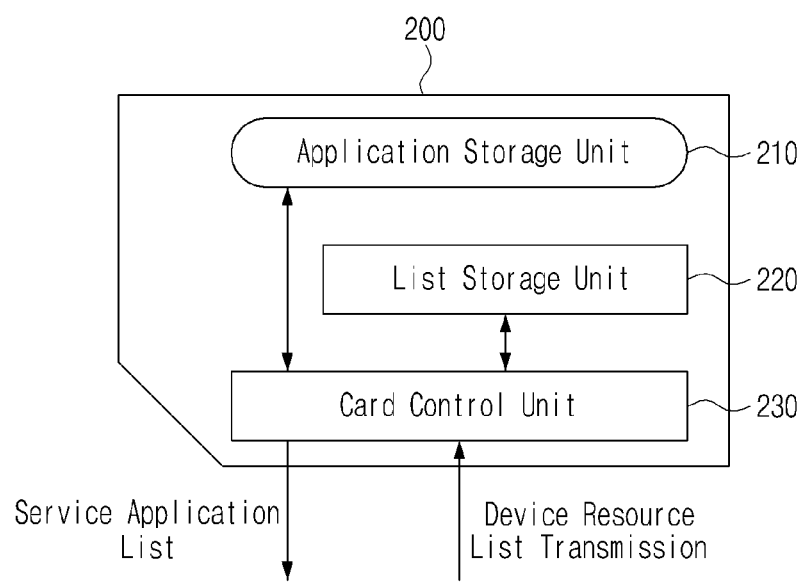
FIG. 3 is an outline rconfiguration of a smart card according to an example embodiment of the present invention.

With reference to FIG. 2 and FIG. 3, the detailed configuration of the terminal (100) and the smart card (200) is described below.

First, let us look at the configuration of the terminal (100) of the present invention by referring to FIG. 2. The terminal (100) has the configuration of an input/output unit (110) including various device resources, a device invocation unit (120) for executing each of various devices, and a terminal control unit (130) for managing the various equipped device resources and for building the interface with the smart card.

The above input/output unit (110) has the configuration including several device resources, for example, a typical UI (User Interface) equipped with mobile communication terminals such as a keypad, LCD screen, speakers, etc. and also including wireless interface such as Bluetooth, WLAN, Cellular Modem, SDMB Receiver, TDMB Receiver, and wired interface such as UART, MMC, T-Flash, and multimedia devices such as a camera or mp3 decoder, and through these, it receives the user requests and also delivers the output value according to the execution of service applications of the smart card (200) by the invocation control of a device invocation unit (120).

The above device invocation unit (120) is loaded with the invocation drivers for invocation control of several device resources equipped in the input/output unit (100), and by this, the output values transmitted from the smart card are to be provided to users by invoking the device resources if the out value is transferred by the execution of a service application of the smart card (200) through the terminal control unit (130).

The above terminal control unit (130) creates the list on the several devices resources equipped during the initial invocation, that is, at the initial negotiation with the smart card (200), and provides the created device resource list to the smart card. In this connection, the terminal control unit (130) receives the service application list capable of interworking based on the above device resource list provided by the smart card (200), and provides the terminal users with the service application list available based on the current terminal performance by registering the received service application list. At this point, the terminal control unit (130) can be provided with the unavailable service application list at the same time, and based on this, it would be desirable to mark the available and unavailable application lists so as to be distinguishable on the menu screen of the terminal. On the other hand, profile information of each of the device resources is included in the above device resource list. For example, if the I/O device required to support is a camera, since the specific information of the device such as pixels, lens brightness, zoom level, the manufacturer would be required, this information must be defined in the device information profile.

As examined above, in the configuration of the terminal (100) according to the present invention, since the terminal (100) has the form of a dummy device only with input/output device resources, the costs for terminal development can be reduced.

Next, with reference to FIG. 3 to examine the configuration of the smart card (200) according to the present invention, the smart card (200) has a Universal Subscriber Identification Module (USIM) with the default configuration, and the configuration including an application storage unit (210), list storage unit (220), and card control unit (230).

The above application storage unit (210) is loaded with several service applications executable based on the software platform. More specifically, the application storage unit (210) can be saved by giving the identification number for each service application to distinguish several service applications.

The above list storage unit (220) stores the device resource list received from the terminal (100) interworking with the above card control unit (230) during the initial invocation with the power supply.

The above card control unit (230) receives and stores the device resource list provided by the terminal (100) during the initial invocation with the power supply, that is, at the initial negotiation step with the terminal (200), and also selects the service applications capable of interworking with the terminal (100) among the applications stored in the application storage unit based on the device resource list stored in the list storage unit (220). More specifically, the card control unit (230) checks the device resources required for interworking during invocation of each service application stored in the application storage unit (210), and designates the service application as a target service application if all the checked device resources exist on the stored device resource list. In addition, the card control unit (230) provides the terminal (100) with the list of the service applications if it is compatible after checking the profile information of the device resource required for interworking during the invocation of the target service application designated above and the profile information of the corresponding device resources included in the device resource list.

As examined above, according to the configuration of the smart card (200) of the present invention, even if the users insert their USIM card into other terminals, the same environment can be provided in which they will be able to use the services as before, and also allowing the mobile carriers to provide the services directly to the customers through the smart card (200) without cooperation of the terminal manufacturers by implementation of core functions of service applications within the smart card (200). Also it is possible to provide the services suitable for terminal performance for various service applications stored in the smart card (200) according to the selective executability depending on the availability of equipped device resources in terminals considering the differences in performance by the manufacturer and applied terminal model.

Figure 4:
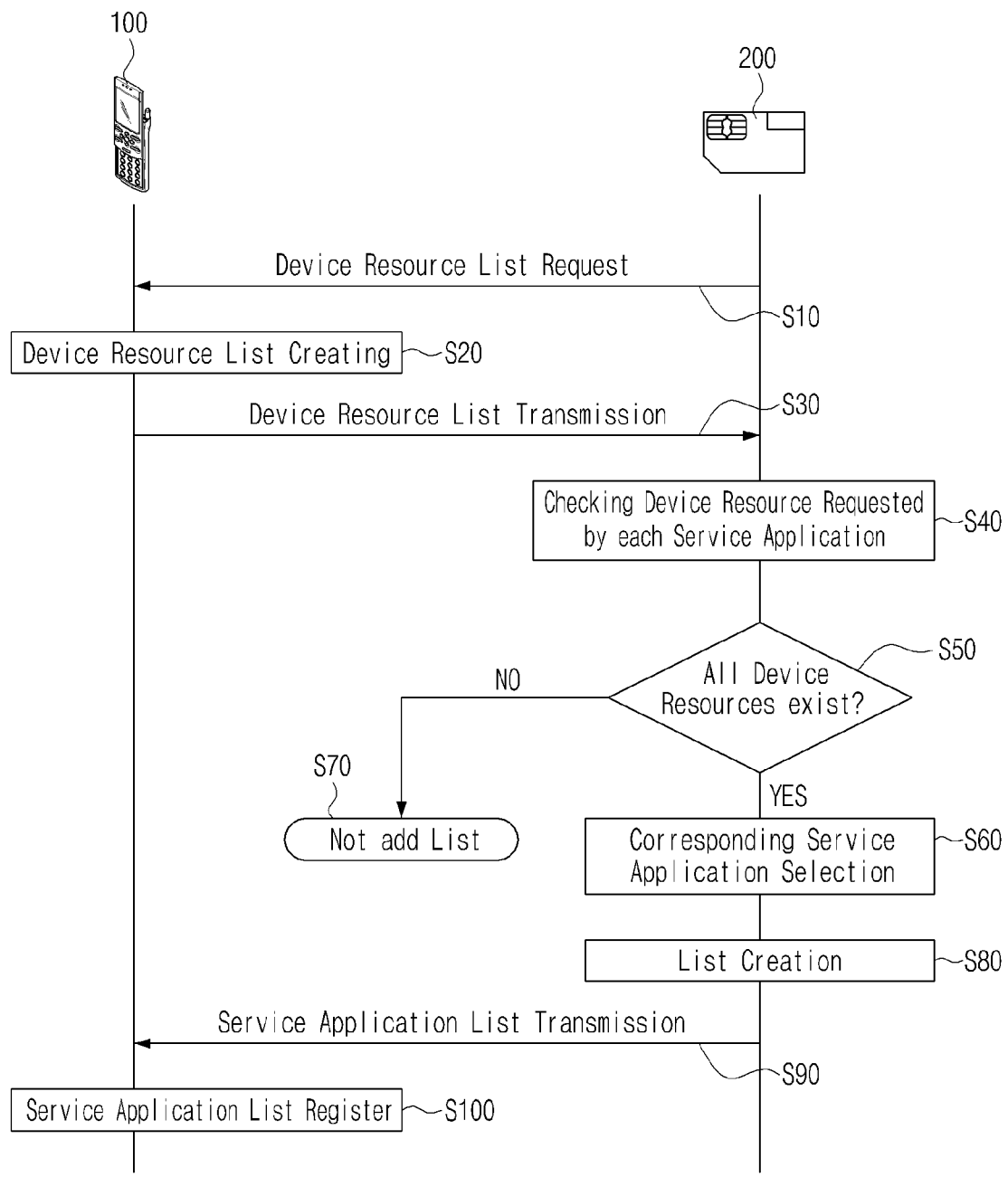
FIG. 4 is a flow chart to describe the interface method between a terminal and a smart card according to an example embodiment of the present invention.
Figure 6:
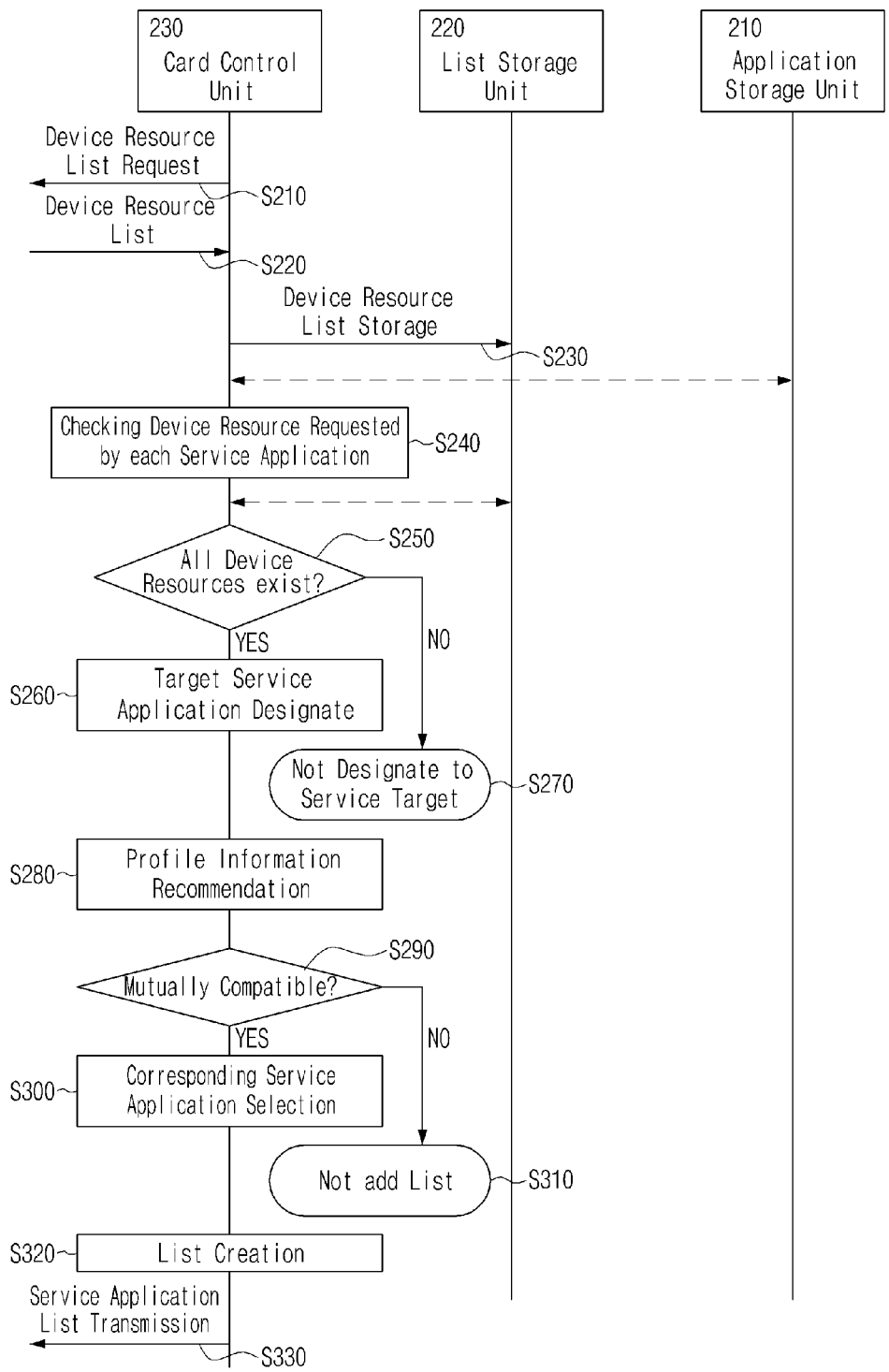
FIG. 6 is a flow chart to describe the behavior of the smart card in the interface method between a terminal and a smart card according to an example embodiment of the present invention.

With reference to FIG. 4 and FIG. 6, the interface method between a terminal and a smart card is to be described below according to an example embodiment of the present invention.

First, with reference to FIG. 4 an interface method between a terminal and a smart card according to an example embodiment of the present invention will be described. Here, for the convenience of description, it is to be described with the reference numbers for the configuration shown in FIGS. 1 and 3.

First, on the initial startup with the power supply, a list is created of device resources equipped for a terminal (100) to be interworking with the execution of service applications and sent to a smart card (200). (S10-S30)

Then, the smart card (200) selects the service applications capable of interworking with the terminal (100) among the stored applications based on the device resource list provided by the terminal (100). (S40-S70) Preferably, a list is created of stored service applications and the device resources are confirmed that are requested for interworking on each startup by the service application of the created applications list. Then, it is determined whether all the above checked device resources exist on the device resource list and a service application is selected as a service application capable of interworking if all the checked device resources exist on the device resource list.

Then, the smart card (100) creates a list of service applications selected above, and provides it to the terminal (100). (S80-S90)

After that, the terminal registers the selected service application list provided from the above smart card (S100). Preferably, the terminal (100) receives the service application list capable of interworking based on the device resource list provided above by the smart card (200), and provides the terminal user with the available service application list based on the performance of the current terminal, by registering the received service application list.

As examined above, according to the interface system between a terminal and a smart card of the present invention, the terminal (100) has only the form of a dummy device, and mobile carriers can provide the services directly to the customers through a smart card (200) without cooperation of the terminal manufacturers by implementing the core functions of service applications within the smart card. In addition, for various service applications stored in the smart card (200), it is possible to provide the services suitable for terminal performance according to the selective executability depending on the availability of equipped device resources in terminals considering the differences in performance by the manufacturer and applied terminal model.

Figure 5:
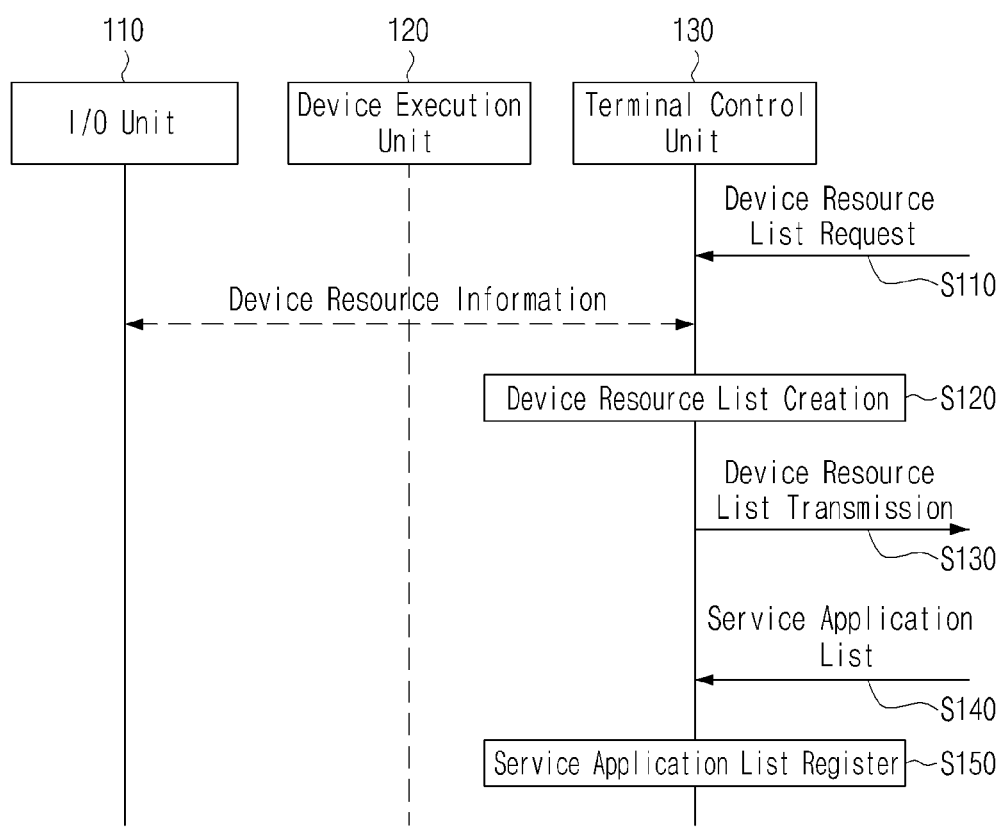
FIG. 5 is a flow chart to describe the behavior of the terminal in the interface method between a terminal and a smart card according to an example embodiment of the present invention.

With reference to FIG. 5, the behavior of the terminal in the interface method between a terminal and a smart card is to be described below according to an example embodiment of the present invention.

First, terminal control unit (130) creates a list of the equipped device resources during the initial invocation, that is, at the initial negotiation with the smart card (200), and provides the created device resource list to the smart card (S110-S130). Preferably, the terminal control unit (130) creates a list of several device resources equipped in an input/output unit (110) according to the request for the transfer of the device resource list from the smart card (200) at the initial negotiation and provides it to the smart card (200).

Then, the terminal control unit (130) receives a list of service applications capable of interworking based on the device resource list provided above from the smart card (200). (S140)

And then, the terminal control unit (130) provides the terminal user with the available service application list based on the performance of the current terminal, by registering the received service application list. (S150)

As examined above, according to the behavior of the terminal (100) according to the present invention, since the terminal (100) has the form of a dummy device only with input/output device resources, the costs for terminal development can be reduced.

With reference to FIG. 6, the behavior of the smart card (200) in the interface method between a terminal and a smart card is to be described below according to an example embodiment of the present invention.

First, a device resource list is received from the above terminal at the initial startup with the power supply and stored (S210-S230). Preferably, the card control unit (230) receives the device resource list provided by the terminal (100) according to the request for transfer of the device resource list at each startup with the power supply, that is, at the initial negotiation step with the terminal (200), and stores the list in a list storage unit (220).

Next, the target service application is designated among the applications stored above based on the stored device resource list (S240-S270). Preferably, the card control unit (230) checks the device resources required for interworking at each startup by the service applications stored in an application storage unit (210), and designates the service application as a target service application if all the checked device resources exist on the stored device resource list.

Next, the target service application is designated among the above stored applications based on the stored resource list (S240-S270). Preferably, the card control unit (230) checks the device resources required for interworking at each startup by the service applications stored in the application storage unit (210), and designates the service application as a target service application if all the checked device resources exist on the stored device resource list.

Then, the service application is selected that is capable of interworking with the above terminal among the above designated target service applications based on the profile information of the device resources included in the device resource list (S280-S310). Preferably, the card control unit extracts profile information of the device resources required for interworking at the startup of the above designated target service applications and checks for the compatibility of profile information of the corresponding device resources included in the device resource list. Then, if it is possible to support mutually between the profile information, a service application is selected as the above service application capable of interworking.

Then, the smart card (100) creates a list of the above selected service applications and provides the terminal (100) with the list, allowing the terminal to register the service application list (S320-S330).

As examined above, according to the behavior of the smart card (200) of the present invention, the users can be provided with the same environment in which they will be able use the same services as they have used even if they insert their USIM cards into other terminals, and the mobile carriers will be able to provide their services directly to the customers without cooperation of the terminal manufacturers by implanting the core functions of the service application within a smart card (200). In addition, it is possible to provide the services suitable for terminal performance for various service applications stored in the smart card (200) according to the selective executability depending on the availability of equipped device resources in terminals considering the differences in performance by the manufacturer and applied terminal model.

Meanwhile, with regard to the embodiment set forth herein, the implementation phases of the algorithm can be implemented directly to the hardware or as software modules executed by the processor, or can be implemented by a combination of them. Software modules may reside on RAM, flash memory, ROM, EPROM, EEPROM, registers, hard disks, removable disks, CD-ROM, or in any other form of publicly known technical storage medium. Illustrative storage medium is connected to the processor, and as a result, the processor can read information from the storage medium and write information to it. Alternatively, storage media can be integrated into the processor. Processors and storage media can be included within the ASIC. The ASIC can be included within the terminal. Alternatively, the processor and the storage medium can be included as individual components within the terminal.

Until now, the present invention has been described in detail with reference to the preferable embodiment, but this invention is not limited to the above embodiment, and technical ideas of the present invention will reach to the extent of possible variations or modifications by anyone even with ordinary knowledge in the technology field to which this invention belongs without aberration from the main points in the patent claims below.

The system and method for interfacing between a terminal and a smart card, and a smart card applied to the same according to the present invention is not only useful for the related technology, but also enough for sales of the applied devices with commercial potential, as well as suitable for practical implementation, transcending the limit of existing technology by providing the configuration of a smart card for preparing selective execution considering the service supportable terminals with a number of stored service applications based on a device resource list, so this is an invention obviously with industrial applicability.

The invention claimed is:

1. An interface system between a terminal and a smart card, the interface system comprising:
   the terminal configured to
      include one or more device resources required for interworking with a smart card during an execution of a service application,
      create a list of the device resources, and
      provide the created list of the device resources to the smart card; and
   the smart card configured to
      store one or more service applications,
      select at least one service application for interworking with the terminal among the stored one or more service applications based on the list of the device resources provided from the terminal, and
      provide a list of the selected at least one service application to the terminal.

2. The interface system of claim 1, wherein the terminal is further configured to
   create the list of the device resources at an initial startup of the terminal with a power supply to the terminal, and
   provide the list of the device resources to the smart card.

3. The interface system of claim 1, wherein the terminal is further configured to
   register the list of the selected at least one service application provided from the smart card and
   provide the terminal's user with the list of the selected at least one service application.

4. The interface system of claim 1, wherein the smart card is further configured to
   designate a service application for interworking with at least one device resource as the service application for interworking with the terminal if the at least one device resource exists on the list of the device resources provided from the terminal.

5. A smart card for preparing an execution of one or more service applications stored in the smart card through interfacing with a terminal in which the smart card is mounted, the smart card comprising:
   an application storage unit configured to store one or more service applications executable based on a software platform;
   a list storage unit configured to store a list of device resources received from the terminal; and
   a card control unit configured to
      select at least one service application for interworking with the terminal among the stored one or more service applications based on the list of the device resources stored in the list storage unit, and
      request for registration in the terminal by providing the terminal with a list of the at least one selected service application.

6. The smart card of claim 5, wherein the smart card control unit is further configured to
   store the list of the device resources received from the terminal in the list storage unit at an initial startup with a power supply to the smart card,
   check at least one device resource required for interworking at each startup of the smart card based on the stored one more service applications, and
   designate a service application for interworking with the at least one device resource as a target service application if the at least one device resource exists on the stored list of the device resources.

7. The smart card of claim 6, wherein the smart card control unit is further configured to
   check a first profile information of the at least on device resource requested for interworking at the startup of the designated target service application and a second profile information of at least one corresponding device resource included in the list of the device resources, and
   add the designated target service application to the list of the selected at least one service application if the designated target service application is configured to support mutually between the first profile information and the second profile information.

8. An interface method for preparing an execution of a service application stored in a smart card, the interface method comprising:
   creating a list of equipped device resources;
   sending the list of the equipped device resources to the smart card;
   receiving a list of at least one service application for interworking with a terminal among stored service applications in the smart card, wherein the service application for interworking with the terminal is selected based on the list of the equipped device resources by the smart card; and
   registering the received list of the selected at least one service application from the smart card.

9. The interface method of claim 8, wherein the list of the equipped device resources is created at a startup with a power supply to the terminal and sent to the smart card.

10. An interface method with a terminal for preparing an execution of stored service applications, the interface method comprising:
   receiving a list of device resources equipped on the terminal from the terminal:
   storing the list of the device resources;
   selecting at least one service application for interworking with the terminal among the stored service applications in a smart card based on the list of the device resources;
   creating a list of the selected at least one service application; and
   providing the terminal with the created list of the selected at least one service application.

11. The interface method of claim 10, wherein the list of the device resources is received from the terminal at a startup with a power supply to the terminal.

12. The interface method of claim 10, wherein the selecting comprises:
   designating target service applications among the stored service applications based on the stored list of the device resources; and
   selecting the at least one service application for interworking with the terminal among the designated service applications based on a profile information of the device resources included in the list of the device resources.

13. The interface method of claim 12, wherein the designating comprises:
- creating a list of the stored service applications;
- checking at least one device resource required for interworking at each startup by the service applications in the list of the stored service applications;
- checking if the at least one device resource exists on the list of the device resources; and
- designating service applications for interworking with the at least one device resource as the target service applications if the at least one device resource exists on the list of the device resources.

14. The interface method of claim 13, wherein the selecting comprises:
- extracting a profile information of the at least one device resource required for interworking at the startup of the designated target service applications;
- checking if the extracted profile information of the at least one device resource is compatible with a profile information of a corresponding device resource included in the list of the device resources; and
- selecting a service application for interworking with the at least one device resource as the at least one service application for interworking with the terminal if the selected service application is configured to support mutually between the extracted profile information of the at least one device resource and the profile information of the corresponding device resources.

15. A computer-readable recording medium comprising computer readable code to control at least one processing device to implement an interface method for preparing an execution of a service application stored in a smart card, the interface method comprising:
- creating a list of equipped device resources;
- sending the list of the equipped device resources to the smart card;
- receiving a list of at least one service application for interworking with a terminal among stored service applications in the smart card, wherein the service application for interworking with the terminal is selected based on the list of the equipped device resources by the smart card; and
- registering the received list of the selected at least one service application.

16. A computer-readable recording medium comprising computer readable code to control at least one processing device to implement an interface method with a terminal for preparing an execution of stored service applications, the interface method comprising:
- receiving a list of device resources equipped on the terminal from the terminal;
- storing the list of the device resources;
- selecting at least one service application for interworking with the terminal among the stored service applications in a smart card based on the list of the device resources;
- creating a list of the selected at least one service application; providing the terminal with the created list of the selected at least one service application; and
- registering the provided list of the selected at least one service application.

\* \* \* \* \*